United States Patent [19]

Buriks et al.

[11] Patent Number: 4,502,977

[45] Date of Patent: Mar. 5, 1985

[54] DEMULSIFIER COMPOSITION AND METHOD OF USE THEREOF

[75] Inventors: Rudolf S. Buriks, St. Louis, Mo.; James G. Dolan, Granite City, Ill.

[73] Assignee: Petrolite Corporation, St. Louis, Mo.

[21] Appl. No.: 490,742

[22] Filed: May 2, 1983

[51] Int. Cl.$^3$ ............................................. B01D 17/04
[52] U.S. Cl. .................................... 252/340; 252/331; 252/344; 252/358; 525/529; 525/530
[58] Field of Search ............... 252/340, 344, 331, 358; 525/480, 481, 485, 89, 529, 530

[56] References Cited

U.S. PATENT DOCUMENTS

| | | | |
|---|---|---|---|
| 2,792,352 | 5/1957 | De Groote et al. | 252/331 |
| 2,792,353 | 5/1957 | De Groote et al. | 252/331 |
| 2,792,354 | 5/1957 | De Groote et al. | 252/331 |
| 2,792,355 | 5/1957 | De Groote et al. | 252/331 |
| 2,792,356 | 5/1957 | De Groote et al. | 252/331 |
| 2,792,357 | 5/1957 | De Groote et al. | 252/331 |
| 2,854,461 | 9/1958 | De Groote et al. | 252/331 |
| 3,166,516 | 1/1965 | Kirkpatrick et al. | 252/344 |
| 3,383,325 | 5/1968 | Seale et al. | 252/331 |
| 4,209,422 | 6/1980 | Zimmerman et al. | 252/344 |

FOREIGN PATENT DOCUMENTS 1010740  5/1977  Canada ............................... 252/344

*Primary Examiner*—Richard D. Lovering
*Assistant Examiner*—Anne Brookes
*Attorney, Agent, or Firm*—Robert E. Wexler

[57] ABSTRACT

Novel demulsifier compositions, their method of preparation and use as demulsifiers are described. The novel demulsifiers comprise the partially condensed reaction product of a blend of at least two oxyalkylated materials with a vinyl monomer. The demulsifiers are useful in the resolution of water-in-oil emulsions.

30 Claims, No Drawings

DEMULSIFIER COMPOSITION AND METHOD OF USE THEREOF

BACKGROUND OF THE INVENTION

1. Field of the Invention

This invention relates to novel demulsifier compositions and to methods of demulsification using same. More particularly, the invention relates to novel demulsifying agents for use in processes adapted for preventing, breaking or resolving emulsions of the water-in-oil type, particularly petroleum emulsions.

More particularly, the present invention relates to novel demulsifier compositions comprising the partially condensed reaction product of a blend of at least two oxyalkylated materials and a vinyl monomer.

Accordingly, it is an object of the present invention to provide a process for resolving water-in-oil emulsions.

A further object of the invention is to provide novel demulsifying compositions as described herein.

A still further object of the invention is to provide a method of preparation of the novel demulsifier compositions described herein.

2. Prior Art

A wide variety of oxyalkylated materials are known to be demulsifiers for the resolution of water-in-oil emulsions. For example, it is well known that demulsifiers have been prepared from the condensation of diglycidyl ethers with polyoxyalkylene glycols and that such demulsifiers have been used to resolve certain crude oil emulsions. Note, for example, U.S. Pat. Nos. 2,792,352–357 and U.S. Pat. No. 3,383,326 and EP Nos. 055433–34.

It is also known that such compositions release the water resulting from the resolved emulsion faster and more completely when blended with more suitable water coalescing agents such as oxyalkylated adducts of phenol-formaldehyde resins, polyalkylene polyamines and the like. Note U.S. Pat. No. 3,511,882.

Further improvements have been realized by further heating and condensing such blends. Note U.S. Pat. No. 3,383,325.

It is also known that water-in-oil emulsions may be resolved by demulsifiers resulting from the reaction of a polyoxyalkylene alcohol with an unsaturated reactant and further reacting the product so formed with an oxygen or nitrogen-containing vinyl addition monomer to afford polyhydric substituted polyethylene backbone emulsion breakers. Note Canadian No. 1,010,740.

Despite the fact that many demulsifiers have been found for resolving water-in-oil emulsions, the oil processing and servicing industries are continually looking for more effective demulsifiers.

SUMMARY OF THE INVENTION

The present invention is concerned with novel demulsifier compositions comprising the partially condensed reaction product of a blend of at least two oxyalkylated materials, such as alkylene oxide block-containing copolymers, e.g., alkylene oxide block copolymers containing different alkylene oxide blocks, alkylene oxide/phenolic block copolymers and alkylene oxide/amine block copolymers, at least one of which is derived from the condensation of a polyoxyalkylene glycol and a diglycidyl ether, with a vinyl monomer and the use of such novel demulsifiers in the resolution of water-in-oil emulsions, particularly petroleum emulsions.

DETAILED DESCRIPTION OF THE INVENTION

It has now been discovered that substantial further improvements in the demulsification activity of such materials may be achieved by co-reaction thereof, under free radical conditions, with vinyl monomers followed by partial condensation at elevated temperatures.

THE OXYALKYLATED REACTANTS

One class of oxyalkylated reactants utilized in the present invention is well known to those skilled in the demulsification art, as is its method of preparation. Such reactants comprise, for example, the condensation products of bisphenol A diglycidyl ethers with polyoxyalkylene glycols, i.e., alkylene oxide block copolymers.

Suitable polyoxyalkylene glycols include polyoxypropylene glycol, polyoxypropylene/polyoxyethylene/polyoxypropylene glycols, polyoxybutylene/polyoxypropylene/polyoxybutylene glycols, polyoxyethylene/polyoxypropylene/polyoxyethylene glycols and the like. Also included are mono-, di- or polyhydroxy compounds which, when oxyalkylated and reacted with diepoxides, yield water-in-oil demulsifiers.

Suitable diepoxides include commercially available materials such as Dow's "DER" resins, Ciba's "ARALDITE" resins and the like. Similar bisphenol A diglycidyl ethers are available from many sources. Various other diepoxides are suitable, if such diepoxides when condensed with oxyalkylated materials, yield water-in-oil demulsifiers. Note, for example, U.S. Pat. Nos. 2,854,461 and 2,792,352–357. Because of price and availability, the diglycidyl ether of bisphenol A is preferred. It has the formula:

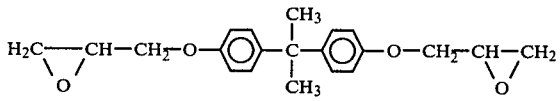

Other diepoxides having substantially similar functionality include bis(4-hydroxyphenyl)methane-diglycidyl ether, bis(4-hydroxy-3,3-dimethylphenyl)methane diglycidyl ether, bis(4-hydroxy-3,5-dichlorophenyl)methane diglycidyl ether, 1,1-bis(4-hydroxyphenol)ethane diglycidyl ether, 2,2-bis(4-hydroxyphenol)propane diglycidyl ether, 2,2-bis(4-hydroxy-3-methylphenyl)propane diglycidyl ether, 2,2-bis(4-hydroxy-3,5-dichlorophenyl)propane diglycidyl ether, bis(4-hydroxyphenyl)phenylmethane diglycidyl ether, (4-hydroxyphenyl)diphenylmethane diglycidyl ether, 1,1bis(4-hydroxyphenyl cyclohexane diglycidyl ether, 4,4'-dihydroxydiphenyl diglycidyl ether, 4,4'-dihydroxydiphenyl sulfone diglycidyl ether, and the like.

Another class of oxyalkylated reactants is exemplified by oxyalkylated phenolic resins prepared by the reaction of phenolic resins with alkylene oxide (i.e, alkylene oxide/phenolic block copolymers) such as ethylene oxide, propylene oxide, butylene oxide and the like or mixtures thereof. Examples of phenolic resins which may be oxyalkylated to afford the oxyalkylated reactants used herein are t-amylphenol/formaldehyde resins, t-butylphenol/formaldehyde resins, nonylphenol/formaldehyde resins and mixed butyl/amyl/nonylphenol/formaldehyde resins and the like. In general, the phenol/formaldehyde resins which are suitable are any of such resins which are known to yield, upon oxyalkylation, materials which are useful as water-in-oil demulsifiers.

Another class of oxyalkylated reactants is exemplified by oxyalkylated polyamides which are prepared by the reaction of polyamines with ethylene oxide, propylene oxide, butylene oxide and the like (i.e., alkylene oxide/amine block copolymers). Examples of polyamines which may be utilized to afford the oxyalkylated polyamide reactants used herein include polyalkylene polyamines such as diethylene triamine, triethylene tetramine, tetraethylene pentamine, dipropylene triamine, tripropylene tetramine, hexamethylene diamine, bishexamethylene triamine and the like. Also useful are phenol/amine/formaldehyde condensates which, upon oxyalkylation, are known to afford water-in-oil demulsifiers.

VINYL REACTANTS

The vinyl monomers which are suitable for use in preparing the demulsifier compositions may be defined as any vinyl monomer which, under free radical conditions, will coreact with the blend of oxyalkylated materials with loss of its vinyl unsaturation and/or will introduce reactive groups which will play a role during the subsequent partial condensation reaction and improve the activity of the final product as a water-in-oil demulsifier.

Examples of vinyl monomers which may be used in the present invention include acrylic and methacrylic acids and their esters, vinyl esters such as vinyl formate, vinyl acetate, vinyl propionate and the like, acrylonitrile, styrene and other vinyl aromatics, vinyl pyridine, vinyl pyrrolidone, acrylamide, maleic anhydride and its esters and half esters and the like. In general, the vinyl monomer may be any unsaturated compound capable of free radical polymerization and coreaction with blends of oxyalkylated reactants.

Preferred vinyl monomers include acrylic acid, methacrylic acid, 2-hydroxyethyl methacrylate, acrylonitrile, maleic anhydride and the like.

ADDITION OF VINYL MONOMER REACTANT TO ALKYLENE OXIDE BLOCK COPOLYMER

Alkylene oxide block copolymer and vinyl monomer reactants described above are reacted to form an intermediate product of the invention under free radical polymerization conditions.

Free radical catalysts which are useful in the reaction include commercially available azo and inorganic and orgaic peroxide initiators such as ammonium acetate, hydrogen peroxide, dilauroyl peroxide, t-butyl peroxide, 2,2-di(butyl peroxy)butane, dicumyl peroxide, 2,2-azobis(2-methyl propionitrile), 2-butylazo-2-cyanobutane, 4(t-butylperoxycarbonyl)-3-hexyl-6-(7-(t-butylperoxycarbonyl)heptyl)cyclohexane and the like.

Preferred catalysts include dibenzoyl peroxide, diacetyl peroxide, dilauroyl peroxide, t-butyl perbenzoate, t-amyl peroctanoate, dicumyl peroxide and the like. In general, the preferred catalysts are organic peroxides which decompose between about 50° and 140° C. and are known to induce grafting. The catalyst may comprise from about 2 to about 40% by weight of the monomer added. Preferably, the catalyst comprises from about 10 to about 20% by weight of the monomer added.

The temperature of the reaction may be from about 40° to 140° C., preferably from about 60° to about 120° C., especially from about 80° to about 100° C. Ideally, the temperature is chosen to be equal to the 10 hour half-life temperature of the catalyst.

The reaction may be conducted in bulk or in solution over a period of time of from about 2 to about 10 hours under ambient pressure conditions.

The reaction between the alkylene oxide block copolymers and vinyl monomer reactant is generally continued until the presence of monomer is no longer detected.

The weight percent of vinyl monomer reactant to neat oxyalkylated reactant will be in the range of from about 1 to about 50%, preferably from about 3 to about 25%, especially from about 5 to about 20% (weight percent calculated as vinyl equivalents of acrylic acid).

PARTIAL CONDENSATION

The intermediate product formed by the reaction of the alkylene oxide block copolymer mixture and the vinyl monomer reactant is subjected to partial condensation under elevated temperature conditions. In general, the partial condensation is carried out at about pH 5 or less and a temperature of from about 100° to about 200° C. depending on the solvent azeotrope boiling point. Preferably, a temperature of 150°–170° C. is desired. The condensation is conducted over a period of from about 6 to about 30 hours, preferably from about 8 to about 20 hours, especially from about 12 to about 16 hours. The optimum time period varies, due to dependence on pH and the reagents used in the previous step.

The products formed by co-reacting the blend of oxyalkylated reactants, or their derivatives, with a vinyl monomer followed by subsequent condensation affords demulsifier compositions which have substantially increased improvement in demulsifier activity over the original oxyalkylated materials.

In a preferred embodiment of the invention, a blend of at least two oxyalkylated reactants, one of which is based on a condensate of polyoxypropylene glycol and the diglycidyl ether of bisphenol A, is reacted with acrylic acid under free radical conditions and partially condensed to afford the final product.

In any case, whether two, three or more oxyalkylated reactants are blended for subsequent reaction with a vinyl monomer reactant, it is preferred that one of the oxyalkylate reactants is based upon a condensate of a polyoxyalkylene glycol and a diglycidyl ether of bisphenol A.

In some cases, this oxyalkylate reactant is further oxyalkylated prior to reaction with the vinyl monomer. Thus for example, a condensate of a polyoxyalkylene glycol and a diglycidyl ether of bisphenol A may be further oxyalkylated to afford the initial oxyalkylate material.

The following, non-limiting examples illustrate specific embodiments of the invention, including the best mode of practice thereof.

In the following sections A, B and C, examples are given for the preparation of diepoxide condensates, resin oxyalkylates and amine oxyalkylates. Section D describes the preparation of the novel demulsifiers from blends of A, B, C materials by reaction with vinyl monomers. Section E illustrates activity as demulsifiers.

A. Condensation Products Prepared with Diglycidyl Ethers

Polyoxyalkylene glycols to be used in condensates with diepoxides were prepared by addition of the desired alkylene oxide or a mixture of two or more oxides to a suitable monohydric or polyhydric compound. The reaction conditions vary somewhat depending on the alkylene oxide used, but generally the temperature employed will be within the range of about 90°–160° C. A small amount of alkaline catalyst is needed for polyglycol formation. Preferred catalysts include potassium hydroxide, sodium hydroxide and sodium hydride with a concentration of about 0.1 to 0.8 weight percent, based on finished product. A non-exclusive list of suitable alcohols, phenols and glycols includes normal and branched alcohols, phenols, propylene glycol, ethylene glycol, butylene glycol, glycerin, pentaerythritol and the like. Table A-1, below illustrates non-limiting examples of suitable polyoxyalkylene glycols.

TABLE A-1

| EXAMPLE | OXYALKYLATED MATERIAL | OXIDE #1* | WT. % | OXIDE #2 | WT. % |
|---|---|---|---|---|---|
| 1 | n-Butanol | PrO | 12.8 | EtO | 10 |
| 2 | Dipropylene glycol | PrO | 20.7 | — | — |
| 3 | Dipropylene glycol | PrO | 100 | EtO | 20 |
| 4 | Dipropylene glycol | PrO | 100 | EtO | 5 |
| 5 | Dipropylene glycol | PrO | 75 | — | — |
| 6 | Dipropylene glycol | PrO | 27.5 | EtO | 7.1 |
| 7 | Dipropylene glycol | PrO | 40 | EtO | 10.0 |
| 8 | Glycerine | PrO | 15 | EtO | 15.0 |
| 9 | Glycerine | PrO/EtO | — | — | 37.5 |
| 10 | Glycerine | PrO | 150 | EtO | 50 |
| 11 | Diethylene glycol | EtO | 5 | PrO | 125 |
| 12 | Diethylene glycol | EtO | 27.5 | PrO | 75 |
| 13 | Dipropylene glycol | BuO | 60 | — | — |
| 14 | Butylene glycol | BuO | 20.5 | EtO | 1.5 |
| 15 | Dipropylene glycol | PrO | 28.4 | EtO | 20.5 |

*PrO = propylene oxide, EtO — ethylene oxide, BuO = butylene oxide

Preparation of diepoxide condensates with the type of polyoxyalkylene glycols illustrated in Table A-1 is carried out according to the following general procedure:

Reaction of polyoxyalkylene glycols with diglycidyl ethers take place at temperatures from 70°–160° C., preferably between about 80° and about 120° C. Generally, the reaction is carried out without solvent, although the reaction can also be carried out in the presence of an inert organic solvent. Normally the molar ratio of polyoxyalkylene glycol to diglycidyl ether is from about 1:0.5 to about 1:1. At the 1:1 ratio, crosslinking may become pronounced and may result in insoluble lumpy material.

To minimize insolubles, the total amount of diglycidyl ether is preferably added in two or three steps, rather than all at once.

The reaction takes place in the presence of alkaline catalysts. Usually, the catalyst that is present in the freshly prepared polyoxyalkylene glycols is all that is needed to prepare the condensate with the diglycidyl ether.

The reaction can also be catalyzed by Lewis acid-type catalysts, such as $ZnCl_2$, $BF_3$-etherates and the like. In this case, the residual catalyst from the initial oxyalkylation is first neutralized, followed by the subsequent addition of the Lewis acid.

The reaction time depends on the temperature and is generally stopped when the epoxy number of the condensate has decreased to 2 or less.

Non-limiting examples illustrating these types of condensates are given in Table A-2.

TABLE A-2

| EXAMPLE | POLYOXYALKYLENE GLYCOL FROM EXAMPLE NO. | PARTS BY WEIGHT | BISPHENOL A DIGLYCIDYLETHER (parts by weight) |
|---|---|---|---|
| 16 | 1 | 100 | 10 |
| 17 | 5 | 100 | 12.5 |
| 18 | 4 | 100 | 7 |
| 19 | 8 | 100 | 5 |
| 20 | 13 | 100 | 12.5 |
| 21 | 11 | 100 | 12.3 |
| 22 | 10 | 100 | 2.5 |
| 23 | 12 | 100 | 12 |
| 24 | 14 | 100 | 5 |
| 25 | 3 | 100 | 10 |

Polyoxyalkylene glycol/diepoxide condensates as illustrated in Table A-2 can be further oxyalkylated using a procedure similar to that for the polyoxyalkylene glycol preparation. Table A-3 gives a few non-limiting examples of oxyalkylated diepoxide/polyoxyalkyleneglycol condensates.

TABLE A-3

| EXAMPLE | CONDENSATE FROM EXAMPLE NO (parts/wt) | OXIDE #1 (Parts/Wt) | OXIDE #2 (Parts/Wt) |
|---|---|---|---|
| 26 | 16–1 | PrO - 0.37 | — |
| 27 | 17–100 | PrO - 15 | — |
| 28 | 19–100 | PrO - 15 | EtO - 10 |
| 29 | 17–50 | EtO - 6 | PrO - 2.25 |
| 30 | 22–100 | PrO - 100 | — |
| 31 | 17–100 | EtO - 125 | — |
| 32 | 24–75 | PrO - 50 | EtO - 25 |
| 33 | 25–100 | EtO - 12 | — |
| 34 | 17–100 | EtO - 12.5 | — |
| 35 | 20–100 | PrO - 134 | — |
| 36 | 20–100 | EtO - 26 | PrO - 39 |
| 37 | 18–100 | EtO - 15 | PrO - 36 |
| 38 | 23–50 | PrO - 12.5 | — |
| 39 | 21–50 | PrO - 60 | — |

B. Alkylphenol/formaldehyde Resins and their Oxyalkylation Products

The following examples illustrate the general method of preparation for acid or base catalyzed phenol/formaldehyde resins and their oxyalkylates.

Acid Catalyzed Resins:

An acid catalyzed butyl phenol-formaldehyde resin was prepared as follows:

A vessel equipped with a stirrer, water trap with reflux condenser, thermometer, and addition tube reaching close to the bottom of the vessel is charged with 160 parts of a hydrocarbon solvent containing about 78% aromatic hydrocarbons and boiling over a range from approximately 175° to 290° C., 8 parts of a 50% solution of crude alkylnaphthalenesulfonic acid in an aromatic solvent, and 168 parts of crude tertiary butylphenol containing 10.4% kerosene. This mixture is heated to 135° C. and stirred to effect solution.

Then 89 parts of 37% aqueous formaldehyde solution is added through the addition tube below the surface of the solution while maintaining a temperature of 135° C. Stirring at this temperature is maintained until no more aqueous distillate is removed, after which 4 parts of 50% caustic soda solution is added followed by 60 parts of aromatic hydrocarbon solvent having approximately the same boiling range as the hydrocarbon solvent originally charged. The solution is heated again to 135° C. and maintained at this temperature under reduced pressure until no more water can be removed before cooling to yield the phenol-formaldehyde resin solution in the hydrocarbon vehicle.

Base Catalyzed Resins:

A reactor was charged with 24.5 lbs. of tert-butyl phenol, 6 lbs. of para formaldehyde and 57.25 lbs. of xylene. The above charge was heated to 50° C. and 0.213 lbs. of 50% aqueous sodium hydroxide was added. The product was heated to 90° C. and held there for 0.5 hours, then heated to reflux. Reflux began at 135° C. and gradually increased to 145° C. under azeotropic conditions to remove 4.0 lbs. aqueous layer and 2.25 lbs. solvent. Total time at reflux was 4½ hours.

The foregoing examples illustrate the production of suitable resins from phenol and formaldehyde. Non-limiting phenol examples include: cresol; ethyl-phenol; 3-methyl-4-ethyl-phenol; 3-methyl-4-propyl-phenol; propyl-phenol; tertiary-butyl-phenol; secondary-butyl-phenol; tertiary-amyl-phenol; secondary-amyl-phenol; tertiary-hexyl-phenol; isooctylphenol; phenyl-phenol; thymol; benzyl-phenol; cyclohexyl-phenol; tertiary-decyl-phenol; dodedyl-phenol; tetradecyl-phenol; octadecyl-phenol; nonyl-phenyl; eicosanyl-phenol; docosanyl-phenol; tetracosanyl-phenol; beta-napthyl-phenol; alpha-naphthyl-phenol; pentadecyl-phenol; and the like.

Resin Oxyalkylation:

The resin solution is transferred to a pressure reactor or autoclave equipped with a means of external (electric) heating, internal cooling and efficient mechanical agitation. The resin is heated to 120°–140° C. and the alkylene oxide or mixture of oxides is charged into the reactor until the pressure is 25–75 psi. The reaction is usually completed in 2 to 12 hours depending upon the nature of the reactants.

In Table B, a cross-section of suitable resin oxyalkylates for use in the present invention is given.

TABLE B

| EXAMPLE | PHENOL USED IN RESIN | CATALYST | PrO (Parts/Wt) | EtO (Parts/Wt) |
|---|---|---|---|---|
| 40 | t-Butyl- | Acid | 19.8 | — |
| 41 | t-Butyl- | Acid | 12.7 | 0.75 |
| 42 | t-Butyl- | Acid | 0.8 | 0.4 |
| 43 | t-Butyl- | Acid | 20.0 | 7.0 |
| 44 | t-Amyl- | Acid | — | 1.0 |
| 45 | t-Butyl- | Acid | 1.1 | 0.17 |
| 46 | t-Butyl- | Acid | 4.4 | 1.0 |
| 47 | Nonyl- | Acid | — | 1.2 |
| 48 | Nonyl- | Acid | 10.45 | 1.20 |
| 49 | Nonyl- | Acid | 2.8 | 2.5 |
| 50 | Nonyl- | Cyclohexyl Amine | 1.75 | — |
| 51 | Butyl/Nonyl | Base | 0.8 | 0.2 |
| 52 | Nonyl | Acid | 30.0 | 7.0 |
| 53 | Nonyl | Diethylene Triamine | 1.84 | 1.62 |
| 54 | t-Amyl | Acid | 2.1 | 1.9 |
| 55 | t-Amyl | Base | 0.4 | 0.2 |
| 56 | t-Butyl | Butylamine | 1.1 | 1.1 |
| 57 | Butyl/Nonyl | Base | — | 0.5 |

C. Amine Oxyalkylates:

Into a stainless steel autoclave with the usual devices for heating, heat control, stirrer, inlet, outlet, etc., which is conventional in this type of apparatus was charged 500 grams of triethylene tetramine, 300 grams of xylene, and 15 grams of sodium methylate. The autoclave was sealed, swept with nitrogen gas and stirring started immediately and heat applied. The temperature was allowed to rise to approximately 145° C. At this particular time the addition of butylene oxide was started. The butylene oxide employed was a mixture of the straight chain isomer substantially free from isobutylene oxide. It was added continuously at such speed that it was absorbed by the reaction as added. The amount added in this operation was 1500 grams. The time required to add the butylene oxide was two hours. During this period the temperature was maintained at 130° C. to 145° C. using cooling water through the inner coils when necessary and otherwise applying heat if required. The maximum pressure during the reaction was 50 pounds per square inch.

Table C presents non-limiting examples of suitable oxyalkylated amines that may be used in the present invention.

TABLE C

| EXAMPLE | AMINE | OXIDE #1 | Parts/Wt | OXIDE #2 | Parts/Wt |
|---|---|---|---|---|---|
| 58 | Triethylene tetramine | Propylene Oxide | 45.5 | Ethylene Oxide | 17.5 |
| 59 | Tetraethylene pentamine | Propylene Oxide | 60.0 | Ethylene Oxide | 30.0 |
| 60 | Trishydroxymethylaminomethane | Propylene Oxide | 60.0 | Ethylene Oxide | 30.0 |
| 61 | Triethylene tetramine | Propylene Oxide | 24.0 | Ethylene Oxide | 11.0 |
| 62 | Diethylene triamine | Ethylene Oxide | 0.42 | — | |
| 63 | Ethylene diamine | Propylene Oxide | 49.0 | — | |
| 64 | Triethylene tetramine | Propylene Oxide | 80.0 | Ethylene Oxide | 40.0 |

D. Reactions of blends of oxyalkylates from Tables A-2, A-3, B and C with vinyl monomers to prepare the novel compositions of this invention The following procedure illustrates the method for preparation of the compositions of this invention:

To a 4-necked flask equipped with a mechanical stirrer, heating device, means to remove distillate and nitrogen purge system were added 44.8 parts of the oxyalkylated reactant of Example 31, 18.4 parts of Example 42, 10.0 parts of Example 58, 5.0 parts of acrylic acid, 1.0 part benzoyl peroxide, 0.4 part of muriatic acid, and 100 parts of an aromatic hydrocarbon solvent. The mixture was then heated to 80° C. for 8 hours during the coreaction step to form the intermediate product. The intermediate product was heated for 16 hours at 160° C. to remove 0.6 parts of water during the condensation step. Upon cooling, 5.6 parts of aromatic hydrocarbon solvent was added. This is Example 65 in Table D.

The example described above is typical of the preparation of the compositions of this invention. The examples of this invention will vary depending on which component from Tables A-2, A-3, B or C are used. The examples will also vary by choice and amount of vinyl monomer. The temperature and initiator during the coreaction of the vinyl monomer and the choice of an acid catalyst for the condensation may also vary. The preparation of illustrative compositions of this invention has been summarized in Table D.

It should be understood that specific responses by a particular crude to a specific composition, as described

TABLE D

| EXAMPLE | OXYALKYLATED REACTANT FROM EXAMPLE | PARTS BY WT | OXYALKYLATED REACTANT FROM EXAMPLE | PARTS BY WT | OXYALKYLATED REACTANT FROM EXAMPLE | PARTS BY WT |
|---|---|---|---|---|---|---|
| 65 | — | — | 31 | 44.8 | 42 | 18.4 |
| 66 | — | — | 31 | 44.8 | 42 | 18.4 |
| 67 | — | — | 31 | 44.8 | 42 | 18.4 |
| 68 | — | — | 31 | 44.8 | 42 | 18.4 |
| 69 | — | — | 31 | 44.8 | 42 | 18.4 |
| 70 | — | — | 31 | 44.8 | 42 | 18.4 |
| 71 | — | — | 31 | 44.8 | 42 | 18.4 |
| 72 | — | — | 31 | 44.8 | 42 | 18.4 |
| 73 | 17 | 53.2 | — | — | 42 | 18.4 |
| 74 | — | — | 31 | 44.8 | 42 | 18.4 |
| 75 | — | — | 34 | 55.7 | 42 | 27.9 } BLEND |
|  |  |  |  |  | 47 | 10.1 |
|  |  |  |  |  | 54 | 5.0 |
|  |  |  |  |  | 55 | 31.0 |
| 76 | 17 | 55.1 | — | — | 52 | 41.5 } BLEND |
|  |  |  |  |  | 47 | 41.5 |
| 77 | 17 | 39.9 | — | — | 51 | 16.1 } BLEND |
|  |  |  |  |  | 43 | 10.6 |

| EXAMPLE | OXYALKYLATED REACTANT FROM EXAMPLE | PARTS BY WT | VINYL MONOMER | PARTS BY WT |
|---|---|---|---|---|
| 65 | 58 | 10.0 | Acrylic Acid | 5.0 |
| 66 | 58 | 10.0 | Acrylic Acid | 10.0 |
| 67 | 58 | 10.0 | Acrylic Acid | 15.0 |
| 68 | 58 | 10.0 | Methacrylic Acid | 5.0 |
| 69 | 58 | 10.0 | Vinyl Acetate | 10.0 |
| 70 | 58 | 10.0 | 2-Hydroxyethylmethacrylate | 10.0 |
| 71 | 58 | 10.0 | Acrylonitrile | 10.0 |
| 72 | 58 | 10.0 | Methyl Acrylate | 10.0 |
| 73 | 58 | 10.0 | Acrylic Acid | 10.0 |
| 74 | 59 | 10.0 | Acrylic Acid | 10.0 |
| 75 | — | — | Acrylic Acid | 5.0 |
| 76 | — | — | Acrylic Acid | 10.0 |
| 77 | — | — | Acrylic Acid | 5.0 |

E. Demulsification with novel compositions of this invention

The compositions of this invention were evaluated by the method generally referred to as the "Bottle Test", described in "Treating Oil Field Emulsions" second edition, issued by Petroleum Extension Service and the Texas Education Agency in cooperation with the American Petroleum Institute, 1955, (revised 1962) pages 39–44. These evaluations were carried out at wells at various locations as listed below in Table E.

TABLE E

| FIELD | LOCATION |
|---|---|
| North Midway | California |
| Baxterville | Mississippi |
| Kinsella | Alberta, Canada |
| Thompson | Texas |
| West Criner | Oklahoma |
| Pennel | Montana |
| Hufford | Kansas |
| Bouldin Crow B | Texas |
| Laguna Once | Venezuela |
| Athabasca Tar Sands | Alberta, Canada |
| Little Buffalo | Wyoming |
| Electra | Texas |
| Salem | Illinois |
| Oregon Basin | Wyoming |
| Tia Juana Pesado | Venezuela | by this bottle test, will vary widely due to the great variety in the nature, composition, character, production method, temperature of the crude oil in question and the specific material under evaluation. In order to establish a reliable method to evaluate the relative performance of these novel products compared to the activity of the individual components, blends of components and commercially available demulsifying agents, as used at different locations, an average overall performance rating was devised as follows:

| No, or very little activity | 0 | indicating good |
| little activity | P (poor) | commercially sig- |
| substantial activity | F (fair) | nificant activity |
| excellent activity | G (good) | |
| equal to or better than material in use | | |

In this rating scheme the field standard, the commercial material actually in use at the particular location, is given a G rating, while all experimental materials are judged relatively to this standard.

Table F illustrates the effectiveness of the novel compositions of this invention upon evaluation at various locations.

TABLE F

| EXAMPLE | EXAMPLE NO. OF MATERIAL TESTED | AVG. PERFORMANCE RATING |
|---|---|---|
| 78 | 65 | G |
| 79 | 66 | G |
| 80 | 67 | F |
| 81 | blend of components of 65 but no vinyl monomer | O |
| 82 | 68 | P |
| 83 | 69 | F |
| 84 | 70 | P-F |
| 85 | 71 | P-F |
| 86 | 72 | P |
| 87 | 73 | G |
| 88 | 74 | G |
| 89 | 75 | F-G |
| 90 | 76 | P |
| 91 | 77 | F |
| 92 | blend of components of 75 but no vinyl monomer | O |
| 93 | blend of components of 76 but no vinyl monomer | O |
| 94 | blend of components of 77 but no vinyl monomer | O |
| 95 | 31 | O-P |
| 96 | 58 | O |
| 97 | 43 | P |
| 98 | 17 | O-P |
| 99 | 42 | O-P |
| 100 | 51 | O |
| 101 | each component of 65 reacted separately with acrylic acid, then blended | O |
| 102 | each component of 75 reacted separately with acrylic acid, then blended | O |

In order to specifically illustrate superior performance of the novel compositions of this invention, the following test is described in detail, using the reaction product of Example 66 tested against several commercially used demulsifiers at one specific location and well. This well, in production at Pennel Field, produced an emulsion with about 15% BS (basic sediment) and 20% free water at about 38°-43° C. which, with knockout drops, ground out to 31% water total.

To obtain results which would more or less predict treatment through the particular treatment system in use, 100 ml samples of produced fluid were treated with the indicated amounts of chemical, followed by mechanical shaking (200 shakes/minute for 2 minutes). The samples were subsequently observed for 15 minutes at ambient temperature at observe any fast water drop. Next, the samples were placed in a 50° C. bath and observed after intervals of 15 and 30 minutes. Finally, the samples were gently shaken 25 times (to imitate the water wash in the system) and ground out fairly close to the interface after another half hour settling at ambient temperature.

Table G summarizes results from this particular test.

TABLE G

| DEMULSIFIER (10% Solution) | MICRO-LITERS | H₂O DOWN 15 MIN. AMBIENT | H₂O DOWN, 50°C. 15 MINUTES | H₂O DOWN, 50°C. 30 MINUTES | FINAL H₂O 30 MIN AMBIENT | GROUND OUT H₂O | GROUND OUT BS | TOTAL WATER |
|---|---|---|---|---|---|---|---|---|
| A | 40 | 0 | Trace | 10 | 18 | 1 | 3.0 | 2.8 |
| B | 40 | 0 | Trace | 12 | 25 | 1 | 3.0 | 2.7 |
| A | 50 | 0 | Trace | 15 | 35 | .3 | 2.1 | 1.6 |
| A | 70 | 0 | Trace | 25 | 27 | .2 | 1.7 | 1.4 |
| C | 30 | 0 | 0 | Trace | Trace | 28 | 6 | 32 |
| C | 50 | 0 | 5 | 25 | 27 | .8 | 1.4 | 2.8 |
| C. | 80 | 0 | 5 | 25 | 29 | | .4 | .9 |
| EX. 66 | 80 | Trace | 8 | 29 | 30 | .3 | .7 | .6 |
| | 50 | Trace | 5 | 19 | 29 | .4 | .6 | .8 |
| | 40 | 0 | Trace | 25 | 27 | .2 | .6 | 1.2 |
| | 35 | 0 | Trace | 26 | 27 | .2 | .8 | 1.1 |
| | 50 | 0 | Trace | 20 | 27 | .8 | .4 | 1.5 |
| EX. 81 | 25 | 0 | 0 | 20 | 23 | 1.2 | .1 | 1.6 |
| | 40 | 0 | Trace | 5 | 14 | 19 | 4.1 | 22 |

In this example, A and B are commercial chemicals which are in use at the test well. C is another commercial product previously used. Note how clearly the initial water drop is enhanced with the demulsifier of this invention and how much less of this product can be used to still obtain good treatment. Also, note how a blend of the same ingredients which have not been reacted to form a novel composition (Example 81) shows no activity.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather than the claims be construed as encompassing all the features of patentable novelty which reside in the present invention, including all features which would be treated as equivalents thereof by those skilled in the art to which the invention pertains.

We claim:

1. Composition comprising the reaction product of (a) a blend of at least two polyoxyalkylene oxide block copolymers, at least one of which is derived from a polyoxyalkylene glycol and a diglycidyl ether, and (b) a vinyl monomer, said reaction product being partially crosslinked.

2. Composition of claim 1 wherein said blend contains a polyoxyalkylene oxide block copolymer which is an oxyalkylated alkylphenol/aldehyde resin.

3. Composition of claim 2 wherein said resin is a blend of an oxyethylated nonylphenol/aldehyde resin and an oxyethylated, oxypropylated nonylphenol/aldehyde resin.

4. Composition of claim 3 wherein said glycol is dipropylene glycol and said ether is a diglycidyl ether of bisphenol A.

5. Composition of claim 2 wherein said resin is a blend of an oxyethylated, oxypropylated t-butylphenol/aldehyde resin and an oxyethylated, oxypropylated butyl/nonylphenol/aldehyde resin.

6. Composition of claim 5 wherein said glycol is dipropylene glycol and said ether is a diglycidyl ether of bisphenol A.

7. Composition of claim 2 wherein said glycol is dipropylene glycol and said ether is a diglycidyl ether of bisphenol A.

8. Composition of claim 1 wherein said blend contains a polyoxyalkylene oxide block copolymer which is an oxyalkylated alkylene polyamine.

9. Composition of claim 8 wherein said oxyalkylated polyamine is an oxyalkylated, oxypropylated triethylene tetramine.

10. Composition of claim 8 wherein said oxyalkylated polyamine is an oxyethylated, oxypropylated tetraethylene pentamine.

11. Composition of claim 1 wherein said monomer is acrylic acid.

12. Composition of claim 1 wherein said monomer is methacrylic acid.

13. Composition of claim 1 wherein said monomer is vinyl acetate.

14. Composition of claim 1 wherein said monomer is 2-hydroxyethylmethacrylate.

15. Composition of claim 1 wherein said monomer is acrylonitrile.

16. Composition of claim 1 wherein said monomer is methyl acrylate.

17. Composition of claim 1 wherein said monomer is maleic anhydride.

18. Composition of claim 1 wherein at least one of said polyoxyalkylene oxide block copolymers is subjected to oxyalkylation prior to reaction with said vinyl monomer.

19. Process of preparing the composition of claim 18 which comprises oxyalkylating said blend, reacting said oxyalkylated blend with a vinyl monomer to afford a reaction product thereof and partially condensing said reaction product.

20. Method of demulsifying a water-in-oil emulsion which comprises incorporating therein an effective demulsifying amount of a composition of claim 18.

21. Composition of claim 18 wherein said copolymer is derived from a polyoxyalkylene glycol and a saturated diglycidyl ether.

22. Composition of claim 21 which further contains an oxyalkylated alkylphenol/aldehyde/resin.

23. Composition of claim 22 which further contains an oxyalkylated alkylene polyamine.

24. Composition of claim 23 wherein said vinyl monomer is acrylic acid.

25. Composition of claim 23 wherein said vinyl monomer is methacrylic acid.

26. Composition of claim 22 wherein said vinyl monomer is acrylic acid.

27. Composition of claim 22 wherein said vinyl monomer is methacrylic acid.

28. Composition of claim 1 wherein said copolymers are derived from the condensation of an oxyethylated, oxypropylated dipropylene glycol and the diglycidyl ether of bisphenol A and the vinyl monomer is acrylic acid.

29. Process for preparing the composition of claim 1 which comprises reacting said blend and said vinyl monomer to afford a reaction product thereof and partially condensing said reaction product.

30. Method of demulsifying a water-in-oil emulsion which comprises incorporating therein an effective demulsifying amount of a composition of claim 1.

* * * * *